UNITED STATES PATENT OFFICE.

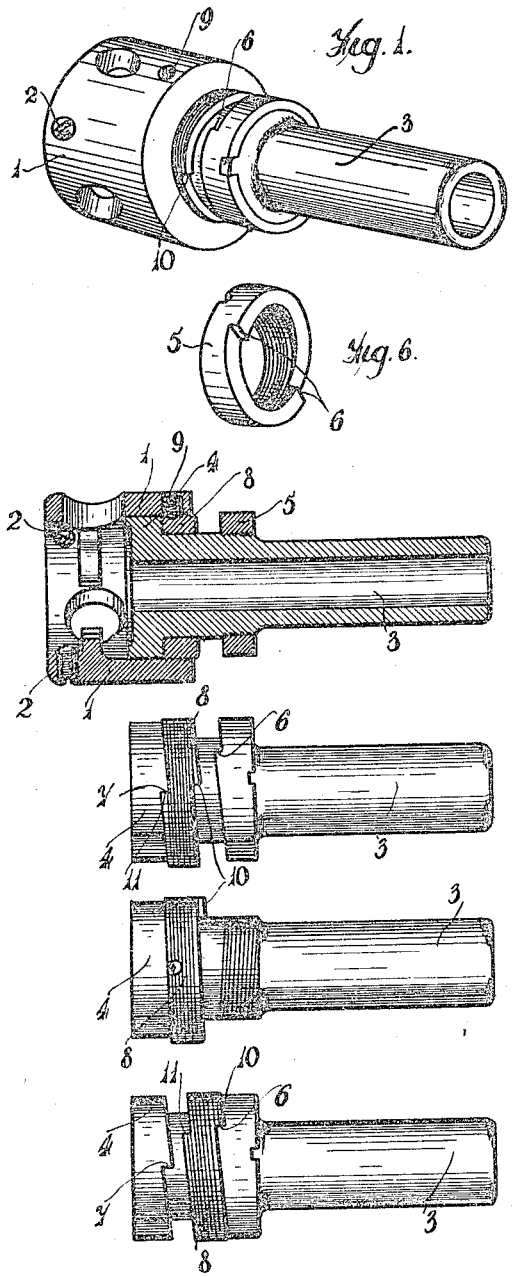

ALBERT HENRY SMITH, OF BIRMINGHAM, ENGLAND.

SCREWING MECHANISM.

1,289,287.  Specification of Letters Patent.  Patented Dec. 31, 1918.

Application filed April 5, 1918. Serial No. 226,942.

*To all whom it may concern:*

Be it known that I, ALBERT HENRY SMITH, subject of the King of Great Britain, residing at 155 St. Luke's road, Birmingham, in the county of Warwick, England, have invented a new and useful Screwing Mechanism; and I do hereby declare the following to be a full, clear, and exact description of the same.

My invention comprises improvements in screwing or tapping mechanism and refers to that class of die or tap holder which is intended for use in connection with a lathe or screwing machine and which is so arranged that when the screwing or tapping operation is completed the die or tap holder is automatically disengaged from the other mechanism whereupon it rotates freely with the work, while when the direction of rotation of the machine is reversed the die or tap holder is automatically held against such movement, permitting the work and die or tap to be disengaged.

The object of the present invention is to provide an improved die head or tap holder of this kind and in accordance therewith the die or tap carrying member is provided with abutments facing both forwardly and rearwardly which co-act with other abutments on a stationary part of the die head or tap holder, these stationary abutments being adapted to hold the die or tap carrier against rotation while the screwing or tapping operation is being performed and also to hold it against rotation in the opposite direction when the die or tap is screwing off.

Preferably the abutting surfaces are of helical form so as to provide an engagement in one direction only and also to provide a smooth engagement in practice.

Referring to the drawings:—

Figure 1 is a perspective view of a die head according to this invention with the abutment ring partially withdrawn.

Fig. 2 is a longitudinal section.

Fig. 3 is an elevation of the mechanism with the die holder or carrier removed and showing the flanges in the position which they occupy when screwing off.

Fig. 4 is a similar view showing the flanges in position as when a screwing or tapping operation is being performed.

Fig. 5 is a plan view of same with the loose flange removed.

Fig. 6 is a perspective view of the loose flange.

In carrying my invention into practice as illustrated upon the accompanying drawings, the die (not shown) is carried by the holder or carrier 1, set screws 2 being provided for securing it in place. The stem 3 of the die head is provided with a fixed flange 4 and a loose flange 5 screwing upon the said stem 3. The flange 5 is provided with a pair of abutment faces 6, the metal of the flange being cut away helically from the bottom of the one face to the top of the other face, the flange 4 being provided with similar helically formed abutments 7 but facing in the opposite direction.

The carrier 1 is provided with an internal flange 8 which, for convenience in manufacture, screws into place and is secured by a grub screw 9, the two faces of this flange being each provided with inclines and abutments 10, 11 of similar form to those previously described, the abutments 10 being adapted to engage with the abutments 6 when the die holder 1 seeks to rotate in the one direction, *i. e.*, when screwing right-hand, while the abutments 11 engage with the abutments 7 when the die and holder are rotated in the opposite direction when screwing off. As shown, the flange 5 screws on to the stem 3 by means of a left-hand thread so that the screwing operation tends to screw the flange more firmly into position and not to release it.

In practice, as is usual, the stem 3 is carried by a slide which is capable of a limited movement along the bed of the lathe or screwing machine according to the length of screw to be cut. When bringing the work into engagement with the die the initial pressure will push the part 1 to its fully receded position, bringing the helical surface of the part 8 into contact with the helical surface of the part 5, the rotation of the parts 8 and 1 then bringing the abutments 6, 10 into engagement, after which the die will screw until the slide has reached the end of its predetermined movement, at the end of which a continued axial movement of the parts 1, 8 due to the screwing connection between the work and the die will disengage the abutments 6, 10. At the conclusion of the screwing operation the direction of rotation of the machine is reversed either automatically or by hand whereupon the abutments 7, 11 will engage and the work will be withdrawn from the die.

The helical inclines insure a smooth and sweet engagement between the parts, for no matter in what position the inclines mutually engage a continuation of this engagement will bring the two abutments into contact, while the abutments 6, 10 or abutments 7, 11 with their inclines each provide a one-way clutch connection so that the parts 5, 8 can only engage in one direction and the parts 4, 8 can only engage in the opposite direction.

The invention would, of course, be similarly applied to tap holders.

What I claim then is:—

1. In screwing mechanism of the kind specified the combination of a stem portion adapted to be held stationary; a screwing tool holder disposed in concentric relation thereto; a pair of annular flanges on the exterior of said stem portion; an annular flange upon the interior of said holder disposed between said pair of exterior flanges, and in rigid relation to said holder; projections on the faces of said flanges adapted to engage when the holder is moved angularly in the one direction; and a second set of abutments on said flange faces and adapted to engage when the holder is moved angularly in the opposite direction; for the purpose specified and substantially as set forth.

2. In screwing mechanism of the kind specified the combination of a stem portion adapted to be held stationary; a screwing tool holder disposed concentrically around the one end of said stem portion and capable of a limited axial movement in relation thereto; a pair of annular flanges on the exterior of said stem portion; an annular flange upon the interior of said holder disposed between said pair of exterior flanges, and in rigid relation to said holder, and a pair of abutments on each of the inner faces of the exterior flanges and on both faces of the interior flange the top of each of which is connected to the base of the other one by a helical incline.

3. In screwing mechanism of the kind specified the combination of a stem portion adapted to be held stationary; a screwing tool holder disposed concentrically around the one end of said stem portion and capable of a limited axial movement in relation thereto; an annular flange integral with said stem portion and upon the exterior and extremity thereof; a second annular flange screwed upon said stem portion; an internal annular flange screwing within the holder; projections on the faces of said flanges adapted to engage when the holder is moved angularly in the one direction; and a second set of abutments on said flange faces and adapted to engage when the holder is moved angularly in the opposite direction.

4. In screwing mechanism of the kind specified the combination of a stem portion adapted to be secured to a stationary part of a machine; a screwing tool holder disposed concentrically around the one end of said stem portion and capable of a limited axial movement in relation thereto; a pair of annular flanges on the exterior of said stem portion; an annular flange within said holder and disposed between the two stem flanges; a pair of abutments and helical inclines on each face of said interior flange; and a pair of abutments and helical inclines on the inner faces of said exterior flanges coacting with those on the interior flange; for the purpose specified and substantially as set forth.

5. In screwing mechanism of the kind specified the combination of a stem portion adapted to be secured to a stationary part of a machine; a screwing tool holder disposed concentrically around the one end of said stem portion and capable of a limited axial movement in relation thereto; a pair of annular flanges on the exterior of said stem portion; an annular flange within said holder and disposed between the two stem flanges; a pair of abutments on each of the inner faces of the exterior flanges and on both faces of the interior flange the top of each of which is connected to the base of the other one by a helical incline; the abutments on the rear face of the interior flange engaging with the abutments on the adjacent face of the exterior flange when the holder is rotated in the one direction while the abutments on the second and forward face of the interior flange engage with the corresponding abutments on the second exterior flange when the holder is rotated in the reverse direction; for the purpose specified and substantially as set forth.

6. In screwing mechanism of the kind specified the combination of a stem portion adapted to be secured to a stationary part of a machine; a screwing tool holder disposed concentrically around the one end of said stem portion and capable of a limited axial movement in relation thereto; a flange integral with said stem portion and upon the exterior and extremity thereof; a second flange screwed upon said stem portion; a flange screwing within the holder; a pair of abutments and helical inclines on each face of said interior flange; and a pair of abutments and helical inclines on the inner faces of said exterior flanges co-acting with those on the interior flange.

In testimony whereof I have signed my name to this specification.

ALBERT HENRY SMITH.

Copies of this patent may be obtained for five cents each, by addressing the "Commissioner of Patents, Washington, D. C."